(12) United States Patent
Raad

(10) Patent No.: US 6,992,403 B1
(45) Date of Patent: Jan. 31, 2006

(54) ELECTRIC POWER AND START SYSTEM

(75) Inventor: Bernard A. Raad, Oxnard, CA (US)

(73) Assignee: Pacific Scientific, Carpinteria, CA (US)

(*) Notice: Subject to any disclaimer, the term of this patent is extended or adjusted under 35 U.S.C. 154(b) by 385 days.

(21) Appl. No.: 10/091,729

(22) Filed: Mar. 6, 2002

Related U.S. Application Data

(60) Provisional application No. 60/274,619, filed on Mar. 8, 2001.

(51) Int. Cl.
*H02J 1/16* (2006.01)
(52) U.S. Cl. .......................................... 307/47; 290/10
(58) Field of Classification Search ................. 307/47; 290/10, 38 R
See application file for complete search history.

(56) References Cited

U.S. PATENT DOCUMENTS 5,281,905 A * 1/1994 Dhyanchand et al. ......... 322/32
5,512,811 A * 4/1996 Latos et al. .................... 322/10

* cited by examiner

*Primary Examiner*—Shawn Riley
(74) *Attorney, Agent, or Firm*—Barnes & Thornburg LLP

(57) ABSTRACT

Disclosed is a power and start system for use with an aircraft engine having a shaft, systems requiring AC power and systems requiring DC power. The system includes an AC/DC starter/generator mechanically coupled to rotate in response to rotation of the engine shaft while the engine is operating in generate mode. Rotation of the starter/generator produces AC and DC power and operates to rotate the shaft of the engine when the engine is in start mode. The system includes a generator control unit which is electrically coupled to the AC/DC starter generator. The generator control unit is also electrically coupled to the systems requiring DC power. A start inverter is configured to be coupled to a DC power source. The start inverter is coupled to the AC/DC starter/generator to provide power for start mode operation. The disclosed system provides multiple levels of redundancy when in the event of a failure to any one or combination f components. Also, the system can be scaled for use with multiple engines to provide further redundancy and related reliability and the operation of the power and start systems.

21 Claims, 13 Drawing Sheets

ELECTRIC POWER AND START SYSTEM

CROSS-REFERENCE

This application claims priority under 35 U.S.C. 119(e) to U.S. Provisional Application Ser. No. 60/274,619, filed Mar. 8, 2001 which is expressly incorporated herein by reference.

BACKGROUND

This disclosure relates to electric power and start systems and more particularly to electric power and start systems for aircraft that replace the standard engine starter, DC starter/generator, and AC deicing alternator while providing redundancy in the generate and start modes.

Aircraft during flight must generate, without assistance, electricity for operation of onboard systems. Also, most modern jet aircraft are provided with engine starters to permit self starting of the engines on the ground and restarting of the engines during flight. Typically, jet aircraft are provided with a DC starter for starting the jet engine and a DC generator for generating direct current for use by onboard systems or a DC starter/generator serving both functions by acting in a start mode and a generate mode. Many modern aircraft are also equipped with an AC deicing alternator for providing alternating current to deicing equipment for in-flight removal of ice from the wings of the aircraft which adversely affects the lift generated by the wings. Often, redundancy is built into such systems to facilitate continued safe flight in the event of a partial system failure.

An electric power and start system in accordance with the present invention replaces the engine starter, DC starter/generator and AC deicing alternator in a conventional aircraft. The electric power and start system disclosed herein includes brushless, self-exciting electromechanical devices coupled by circuitry which provides triple redundancy in the generate and start modes. The disclosed power and start system for use on a twin engine aircraft includes four AC/DC brushless starter/generators, four DC generator control units and two start inverters.

Additional features of the disclosure will become apparent to those skilled in the art upon consideration of the following detailed description of a preferred embodiment exemplifying the best mode of carrying out the electric power and start system as presently perceived.

BRIEF DESCRIPTION OF THE DRAWINGS

In describing the disclosed disclosure reference will be made to the drawings in which.

DETAILED DESCRIPTION OF THE DRAWINGS

Figure 1:
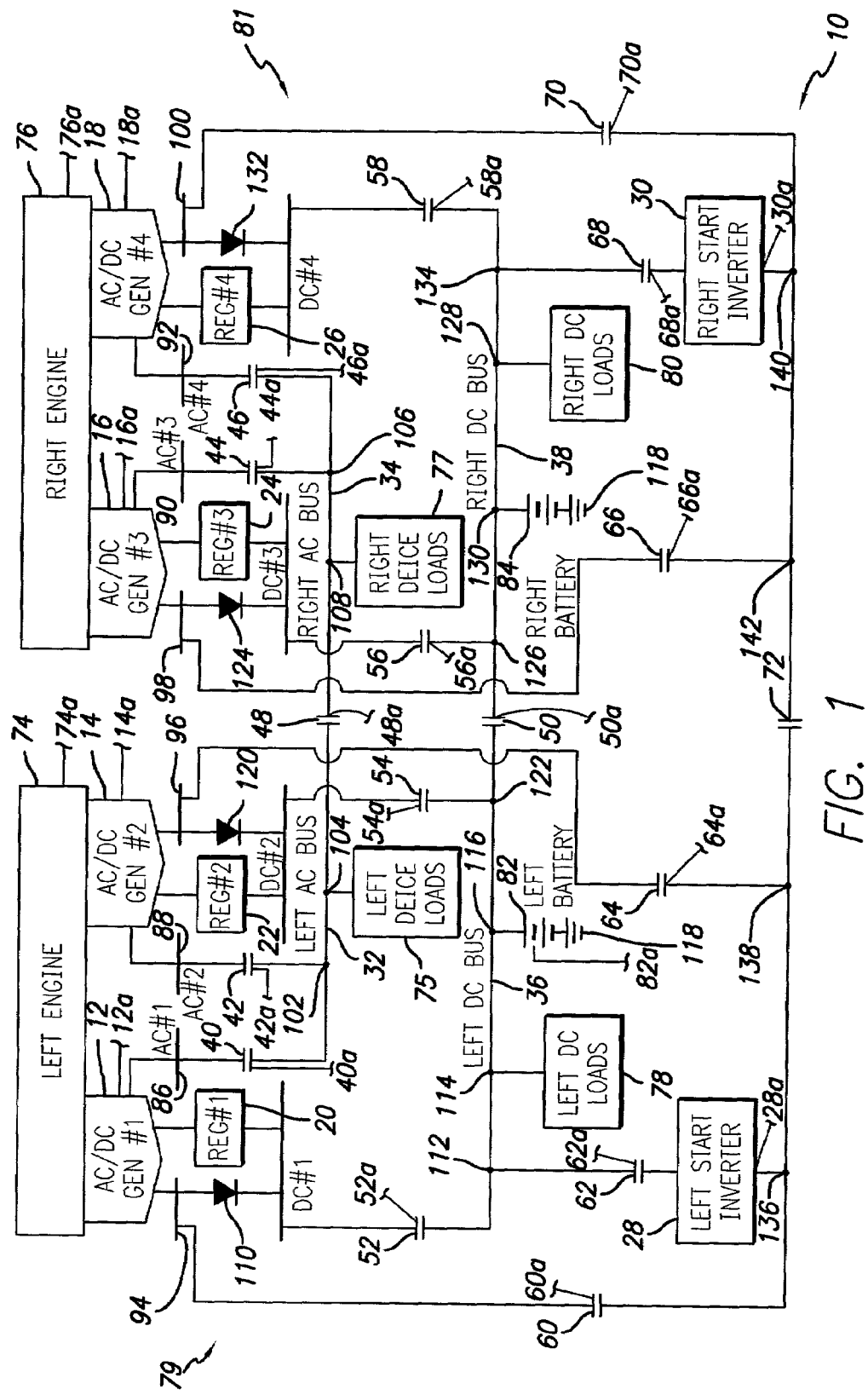
FIG. 1 is a diagrammatic view of an embodiment of the electric power and start system as disclosed coupled to a left and right engine of an aircraft showing four AC/DC starter/generators two of which are coupled to each engine, four DC generator control units coupled one each to the four AC/DC starter/generators, two start inverters coupled one each per engine and circuitry coupling the electrical power and start system to left and right deicing equipment, left and right batteries, and left and right DC loads for onboard systems.
Figure 1A:
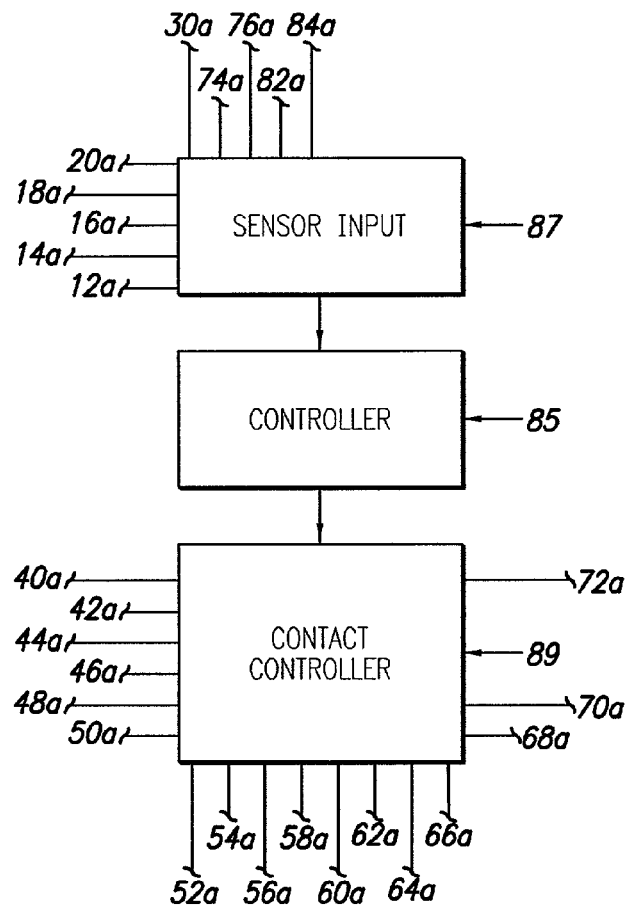
FIG. 1(a) is a simplified diagrammatic view of a controller which is coupled to the engines and electrical systems.

The emergency power and start system ("EPASS") or power and start system 10 as described provides a brushless self-exciting system with triple redundancy in the start and generate modes. This triple redundancy is provided by providing four AC/DC starter/generators 12, 14, 16, 18, four generator control units 20, 22, 24, 26, two start inverters 28, 30, left and right AC busses 32, 34, left and right DC busses 36, 38, and seventeen contactors 40, 42, 44, 46, 48, 50, 52, 54, 56, 58, 60, 62, 64, 66, 68, 70, 72, as shown, for example, in FIG. 1. Contactors 40, 42, 44, 46, 48, 50, 52, 54, 56, 58, 60, 62, 64, 66, 68, 70, 72, first contactor through are electromagnetic switches that may be controlled either manually or automatically according to a predetermined logic. The illustrated embodiment of EPASS 10 is configured for use on a jet airplane having two engines 74, 76, having a left electrical system 79 and a right electrical system 81, left and right systems requiring AC loads or power such as deicing equipment 75, 77, left and right onboard systems requiring DC loads or power 78, 80 and left and right batteries 82, 84.

As shown in FIG. 1(*a*) a controller 85 is coupled to a sensor 87 and a contact controller 89. All of these components can be embodied in a single controller where maybe discreet subunits. Nevertheless, the controller 85 receives inputs from the sensors coupled to each of the major components in the system. In this regard, sensors are 8 sensors 12, 14, 16, 18, 74, 76, 82, 84. There are also 17 connections 40, 42, 44, 46, 48, 50, 52, 54, 56, 58, 60, 62, 64, 66, 68, 70, and 72 to connect the controller to each of the contactors. Logic within the controller receives input from the sensors and activates the contactors in accordance with the inputs from the sensors. As will be described in greater detail herein below, there may be a condition where the left engine 74 is no longer operating. The sensor 74(*a*) will provide feedback to the controller 85 indicating the left engine 74 has ceased operating. When this condition is sensed, any number of contactors may be operated to provide power to the systems that were previously powered by the operation of the engine 74(*a*). The sensors associated with each of the systems in generally known construction and senses a characteristic of the component such as voltage or current. Controller 85 is of known construction where receiving inputs from the sensors and processing these inputs in relation to predetermined logic to provide a resultant output to operate the contactors pursuant to the predetermined logic.

As shown, for example, in FIG. 1, first and second AC/DC starter/generators 12 and 14 are coupled to left engine 74 and third and fourth AC/DC starter/generators 16 and 18 are coupled to right engine 76. It is common for the rotating shafts of a starter motor to be coupled to the shaft of a jet engine so that rotation of the shaft of the starter motor will induce rotation of the shaft of the jet engine providing compression during engine start. It is also common for the shaft of a generator to be coupled to the rotating shaft of a jet engine so that electrical power can be generated during engine operation. AC/DC starter/generators 12, 14, 16, 18 are coupled to engines 74 and 76 in this known manner. All rotating electromechanical devices may function in a motor mode or a generator mode, AC/DC starter/generators 12, 14, 16, 18 operate in both modes acting as a starter motor during engine start and as a generator after engine startup as will be described in detail later.

When in the generate mode, AC/DC starter/generators 12, 14, 16, 18 provide dual outputs of both alternating current and direct current. Illustratively, the average AC output is 3 kV and the average DC output is 400 volts. Each AC/DC starter/generator 12, 14, 16, 18 includes a corresponding AC output coupling 86, 88, 90, 92, respectively, at which the 3 kVA AC output is present when operating in the generate mode. Each AC/DC starter/generator 12, 14, 16, 18 also includes a corresponding DC input/output coupling 94, 96, 98, 100, respectively, at which the 400 A DC output is present when operating in the generate mode. Thus, each AC/DC starter/generators 12, 14, 16, 18 provides both the AC and DC power for the aircraft when operating in the generate mode. This allows the four AC/DC starter/generators 12, 14, 16, 18 to replace the two DC starter/generators and the two deice generators of a conventional aircraft.

As shown, for example, in FIG. 1, number one AC/DC starter/generator 12 is mechanically coupled to left engine 74 and electrically coupled at AC output coupling 86 through contactor 40 to left AC bus 32 at node 102. Likewise, number two AC/DC starter/generator 14 is mechanically coupled to left engine 74 and electrically coupled at AC output coupling 88 through contactor 42 to left AC bus 32 at node 102. Left AC bus 32 is electrically coupled at node 104 to left deicing equipment 75 and contactor 48.

Number three AC/DC starter/generator 16 is mechanically coupled to right engine 76 and electrically coupled at AC output coupling 90 through contactor 44 to right AC bus 34 at node 106. Likewise, number four AC/DC starter/ generator 18 is mechanically coupled to right engine 76 and electrically coupled at AC output coupling 92 through contactor 46 to right AC bus 34 at node 106. Right AC bus 34 is electrically coupled at node 108 to right deicing equipment 77 and contactor 48. Contactor 48 provides a switchable electrical coupling between left AC bus 32 and right AC bus 34.

When contactor 48 is open, left deicing equipment 75 may be powered by AC/DC starter/generator 12 alone, AC/DC starter/generator 14 alone, or by both AC/DC starter/generator 12 and 14, while right deicing equipment 77 may be powered by AC/DC starter/generator 16 alone, AC/DC starter/generator 18 alone, or by both AC/DC starter/generator 16 and 18. Thus, even with contactor 48 open there is redundancy on both the right and left AC busses 32, 34.

When contactor 48 is closed, the left deicing equipment 75 and the right deicing equipment 77 may be powered by AC/DC starter/generator 16 alone, AC/DC starter/generator 18 alone, or by both AC/DC starter/generator 16 and 18 in the event of left engine failure or simultaneous failure of both AC/DC starter/generator 12 and AC/DC starter/generator 14. Similarly, in the event of right engine failure or the simultaneous failure of AC/DC starter/generator 16 and AC/DC starter/generator 18, the left deicing equipment 75 and the right deicing equipment 77 may be powered by AC/DC starter/generator 12 alone, AC/DC starter/generator 14 alone, or by both AC/DC starter/generator 12 and 14. This adds two additional levels of redundancy to AC power generation.

While the circuitry would permit either deicing equipment 75, 77 to be jointly powered by one or both of AC/DC starter/generators 12 and 14 and one or both of AC/DC starter/generators 16 and 18, contactor 48 would typically not be closed to allow this configuration to avoid current mismatching.

As shown, for example, in FIG. 1, number one AC/DC starter/generator 12 is electrically coupled at DC input/output coupling 94 through diode 110, DC generator control unit 20 and contactor 52 to left DC bus 36 at node 112. Left DC bus 36 is electrically coupled at node 114 to left DC onboard system 78 and through node 116 and left battery 82 to ground 118. Thus when contactor 52 is closed, and AC/DC starter/generator 12 is in the generate mode, AC/DC starter/generator 12 provides power to drive the left DC onboard systems 78 and to recharge the left battery 82.

Likewise, number two AC/DC starter/generator 14 is electrically coupled at DC input/output coupling 96 through diode 120, DC generator control unit 22 and contactor 54 to left DC bus 36 at node 122. Left DC bus 36 is electrically coupled at node 114 to left DC onboard system 78 and through node 116 and left battery 82 to ground 118. Thus when contactor 54 is closed, and AC/DC starter/generator 14 is in the generate mode, AC/DC starter/generator 14 provides power to drive the left DC onboard systems 78 and to recharge the first DC power source or left battery 82. Left DC bus 36 is also electrically coupled through node 122 to contactor 50.

Number three AC/DC starter/generator 16 is electrically coupled at DC input/output coupling 98 through diode 124, DC generator control unit 24 and contactor 56 to right DC bus 38 at node 126. Right DC bus 38 is electrically coupled at node 128 to right DC onboard system 80 and through node 130 and right battery 84 to ground 118. Thus when contactor 56 is closed, and AC/DC starter/generator 16 is in the generate mode, AC/DC starter/generator 16 provides power to drive the right DC onboard systems 80 and to recharge the second DC power source or right battery 84.

Left DC bus 36 is electrically coupled through node 122 and contactor 50 to right DC bus 38. Likewise, number four AC/DC starter/generator 18 is electrically coupled at DC input/output coupling 100 through diode 132, DC generator control unit 26 and contactor 58 to right DC bus 38 at node 134. Right DC bus 38 is electrically coupled at node 128 to right DC onboard system 80 and through node 130 and right battery 84 to ground 118. Thus when contactor 58 is closed, and AC/DC starter/generator 18 is in the generate mode, AC/DC starter/generator 18 provides power to drive the right DC onboard systems 80 and to recharge the right battery 84. Right DC bus 38 is also electrically coupled through node 126 and contactor 50 to left DC bus 36.

When contactor 50 is open, left onboard equipment 78 may be powered and left battery 82 charged by AC/DC starter/generator 12 alone, AC/DC starter/generator 14 alone, or by both AC/DC starter/generators 12 and 14 in combination. Right onboard systems 80 may be powered and right battery 84 charged by AC/DC starter/generator 16 alone, AC/DC starter/generator 18 alone, or by both AC/DC starter/generators 16 and 18 in combination. Thus even with contactor 50 open there is redundancy on both the right and left DC busses 36, 38.

When contactor 50 is closed, left onboard systems 78 and right onboard systems 80 may be powered and left battery 82 and right battery 84 charged by AC/DC starter/generator 16 alone, AC/DC starter/generator 18 alone, or by both AC/DC starter/generators 16 and 18 in the event of left engine failure or simultaneous failure of both AC/DC starter/generator 12 and AC/DC starter/generator 14. Similarly, in the event of right engine failure or the simultaneous failure of AC/DC starter/generator 16 and AC/DC starter/generator 18, the left onboard systems 78 and the right onboard systems 80 may be powered and the left battery 82 and right battery 84 charged by AC/DC starter/generator 12 alone, AC/DC starter/generator 14 alone, or by both AC/DC starter/generators 12 and 14. This adds two additional levels of redundancy to DC power generation.

AC/DC starter/generator 12 is also electrically coupled at DC input/output coupling 94 through contactor 60 and node 136 to left start inverter 28. Similarly, AC/DC starter/generator 14 is electrically coupled at DC input/output coupling 96 through contactor 64, node 138, and node 136 to left start inverter 28. Left start inverter 28 is electrically coupled through contactor 62, node 112, left DC bus 36, and node 116 to left battery 82. Left DC bus 36 is also coupled through node 122, contactor 50, node 126, right DC bus 38, and node 130 to right battery 84.

During normal left engine start mode, contactors 60, 62, 64 are closed and start inverter 28 inverts the voltage generated by the battery 82 to induce rotation of the shafts of AC/DC starter/generators 12, 14 which induce rotation of the shaft of left engine 74.

Similarly, during right engine start mode, contactors 56, 68 and 70 are closed and start inverter 30 inverts the voltage generated by the battery 84 to induce rotation of the shafts of the AC/DC starter/generators 16, 18 which induce rotation of the shaft of right engine 76. Still during this normal left and right engine start mode, contactors 48, 50 and 72 are open. Under these circumstances, generally the left electrical system 75 will operate the left loads 78, left battery 82 and left deice loads 75 whereas the right electrical system 77 will operate the right loads 80, right battery 84 and right deicing loads 77. When contactor 50 is open only left battery 82 provides power to AC/DC starter/generators 12, 14 during left engine start mode. When contactor 50 is closed, both right battery 84 and left battery 82 provide power to AC/DC starter/generators 12, 14 during left engine start mode. In the event of left battery 82 failure, contactor 50 is closed and right battery 84 provides power to AC/DC starter/generators 12, 14 during start mode. Thus, redundancy, as well as cold weather starting ability, is provided for left engine start mode. Either AC/DC starter/generator 12, 14 is sufficiently powerful to start left engine 74 when acting alone thereby providing additional redundancy to the EPASS 10 during start mode.

In a similar fashion, AC/DC starter/generator 18 is electrically coupled at DC input/output coupling 100 through contactor 70 and node 140 to right start inverter 30. Similarly, AC/DC starter/generator 16 is electrically coupled at DC input/output coupling 98 through contactor 66, node 142, and node 140 to right start inverter 30. Right start inverter 30 is electrically coupled through contactor 68, node 134, right DC bus 38, and node 130 to right battery 84. Right DC bus 38 is also coupled through node 126, contactor 50, node 122, left DC bus 36, and node 116 to left battery 82.

During normal right engine start mode, contactors 66, 68, 70 are closed and start inverter 30 inverts the voltage generated by the batteries to induce rotation of the shafts of AC/DC starter/generators 16, 18 which induce rotation of the shaft of right engine 76. When contactor 50 is open only right battery 84 provides power to AC/DC starter/generators 16, 18 during right engine start mode. When contactor 50 is closed, both right battery 84 and left battery 82 provide power to AC/DC starter/generators 16, 18 during right engine start mode. In the event of right battery 84 failure, contactor 50 is closed and left battery 82 provides power to AC/DC starter/generators 16, 18 during right engine start mode. Thus, redundancy, as well as cold weather starting ability, is provided for right engine start mode. Either AC/DC starter/generator 16, 18 is sufficiently powerful to start right engine 76 when acting alone thereby providing additional redundancy to the system 10 during start mode.

Even more redundancy is provided by system 10 during right or left engine start mode. Node 138 is coupled through contactor 72 to node 142. In the event of right start inverter 30 failure, upon closure of contactors 62, 72, 66, and 70, power for right engine start can be provided by left battery 82 through left start inverter 28 to AC/DC starter/generators 16 and 18. When contactor 50 is also closed, both left battery 82 and right battery 84, or right battery 84 alone in the event of left battery 82 failure, can provide power to AC/DC starter/generators 16 and 18 for starting of right engine 76.

Similar additional redundancy is provided for left engine start mode in the event of left start inverter 28 failure. Upon closure of contactors 68, 72, 64, and 60, power for left engine start can be provided by right battery 84 through right start inverter 30 to AC/DC starter/generators 12 and 14. When contactor 50 is also closed, both left battery 82 and right battery 84, or left battery 82 alone in the event of right battery 84 failure, can provide power to AC/DC starter/ generators 12 and 14 for starting left engine 74.

Figure 4:
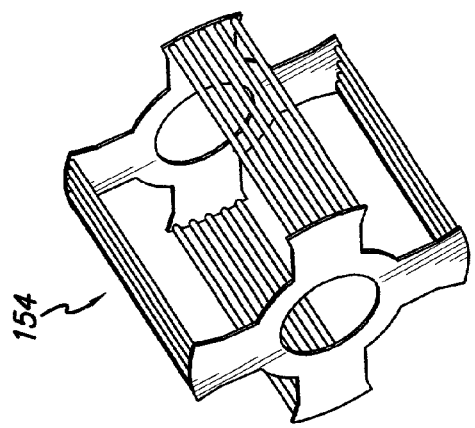
FIG. 4 is a perspective view of a Amortisseur circuit of an AC/DC starter/generator of FIG. 1.
Figure 3:
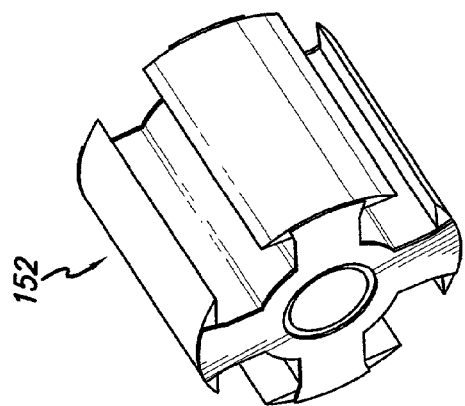
FIG. 3 is a perspective view of a rotor core stack of an AC/DC starter/generator of FIG. 1.
Figure 2:
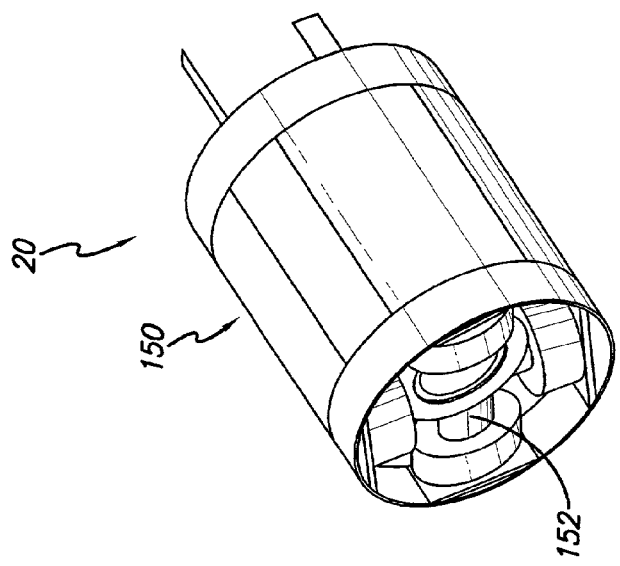
FIG. 2 is a perspective view of a wound rotor of an AC/DC starter/generator of FIG. 1.

As shown, for example in FIGS. 2, 3, and 4, each AC/DC starter/generator 12, 14, 16, 18 includes a wound rotor 150 surrounding a core stack 152 and a heavy duty Amortisseur circuit 154. The Amortisseur circuit 154 emulates an induction motor squirrel cage in start mode when AC/DC starter/ generator 12, 14, 16, 18 is acting as a motor. When AC/DC starter/generator 12, 14, 16, 18 is acting as a generator in generate mode, Amortisseur circuit 154 serves several functions. In generate mode, Amortisseur circuit 154 acts as an electromagnetic shock absorber or damper, as a phase load equalizer, and as a retainer of the rotor stack.

As previously mentioned, AC/DC starter/generators 12, 14, 16, 18 are brushless, self-exciting rotating electromechanical devices designed to generate both DC and AC current. Because they are brushless, AC/DC starter/generators 12, 14, 16, 18 are more reliable than commutator and brush motors. Brushless motors also produce no brush dust which would require maintenance, and produce less electromagnetic interference by eliminating commutator sparking which might adversely affect other aircraft systems. Illustratively, AC/DC starter/generators 12, 14, 16, 18 are air cooled-reversed airflow machines with auxiliary bearings and bearing failure indicators. Each AC/DC starter/generator 12, 14, 16, 18 also includes a field shorting switch.

Figure 5:
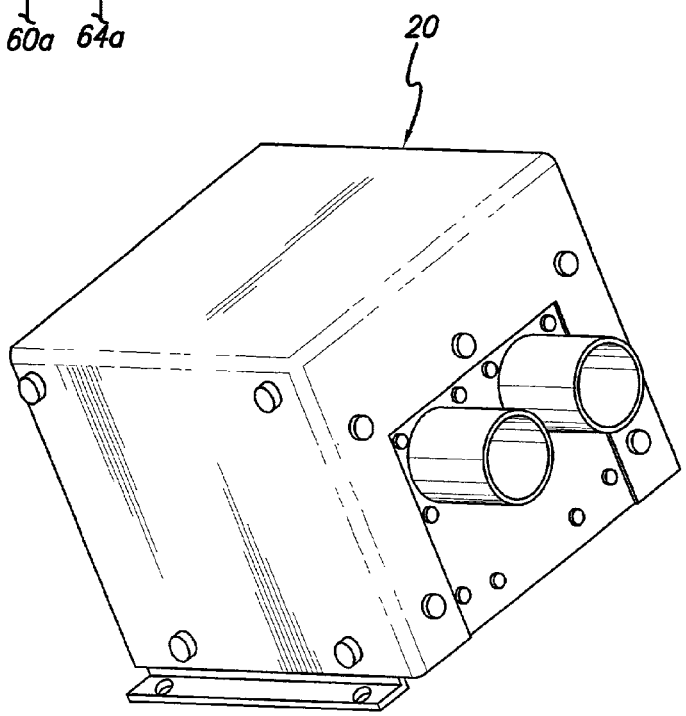
FIG. 5 is a perspective view of a generator control unit of FIG. 1.

Referring to FIG. 5, a typical generator control unit 20 is shown. Illustratively, each of the first through fourth generator control units 20, 22, 24, 26 is identical and is composed of all solid state discrete components contained in a housing having an input and output. Generator control unit 20, 22, 24, 26 includes built-in test circuitry to assure proper operation of the unit. Each generator control unit 20, 22, 24, 26 regulates the DC power output by its respective AC/DC starter/generator 12, 14, 16, 18, respectively, when the system 10 is in the generate mode. Each generator control unit 20, 22, 24, 26 is protected against lightning strikes and also provides a protective function to the remainder of the system 10 circuitry. As seen in FIG. 5, each output coupling of generator control units 20, 22, 24, 26 includes multiple pins to facilitate control of the contactors associated with its AC/DC starter/generator 12, 14, 16, 18.

Each of the first and second start inverters 28, 30 is identical and selectively inverts the voltage of the battery or batteries to provide a wave driver signal to the windings of the AC/DC starter/generators 12, 14, 16, 18 when acting as starter motors in the start mode. It is within the teaching of the present disclosure for each start inverter 28, 30 to be either microprocessor based or composed of integrated circuits and/or discrete components. Illustratively, start inverters 28, 30 are variable voltage and variable frequency devices facilitating proper adjustment of the driver signal and waveform to AC/DC starter/generators 12, 14, 16, 18. Start inverters 28, 30 are air cooled by electric fans. Since AC/DC starter/generators 12, 14, 16, 18 are brushless machines, they inherently include sensors capable of determining the rotor position and or velocity. These sensors provide rotor velocity feedback with PMG frequency information to the start inverters 28, 30 to facilitate proper adjustment of the winding driver waveform by maintaining a constant voltage to Herz ratio. Start inverters 28, 30 are capable of programmable ramp up of the winding driver waveform allowing the driver waveform to be adjusted according to the shaft speed and velocity. Illustratively, start inverters 28, 30 weigh approximately one pound/HP of the AC/DC starter/generators 12, 14, 16, 18.

As previously stated, the system 10 provides triple redundancy in both the start mode and generate mode. FIGS. 6–15 diagrammatically depict operation of the system 10 in various modes under both normal and various failure conditions. In FIGS. 6–15, current paths are indicated by bold lines, open contactors are illustrated by parallel lines, and closed contactors are indicated by slashes through parallel lines. While failure of specific components are illustrated in FIGS. 7–10 and 12–15, those skilled in the art will recognize that similar component failures can be handle in a similar manner through proper configuration of the contactors 40, 42, 44, 46, 48, 50, 52, 54, 56, 58, 60, 62, 64, 66, 68, 70, 72. As previously mentioned, contactors 40, 42, 44, 46, 48, 50, 52, 54, 56, 58, 60, 62, 64, 66, 68, 70, 72 are electromagnetic switches that may be controlled either manually or automatically according to a predetermined logic. Though FIGS. 6–15 do not completely exhaust the failure modes, by examination of FIGS. 6–15, those skilled in the art can easily determine the proper configuration of the contactors 40, 42, 44, 46, 48, 50, 52, 54, 56, 58, 60, 62, 64, 66, 68, 70, 72 for any failure mode and thus develop the appropriate predetermined logic to address any anticipated failure mode.

Figure 6:
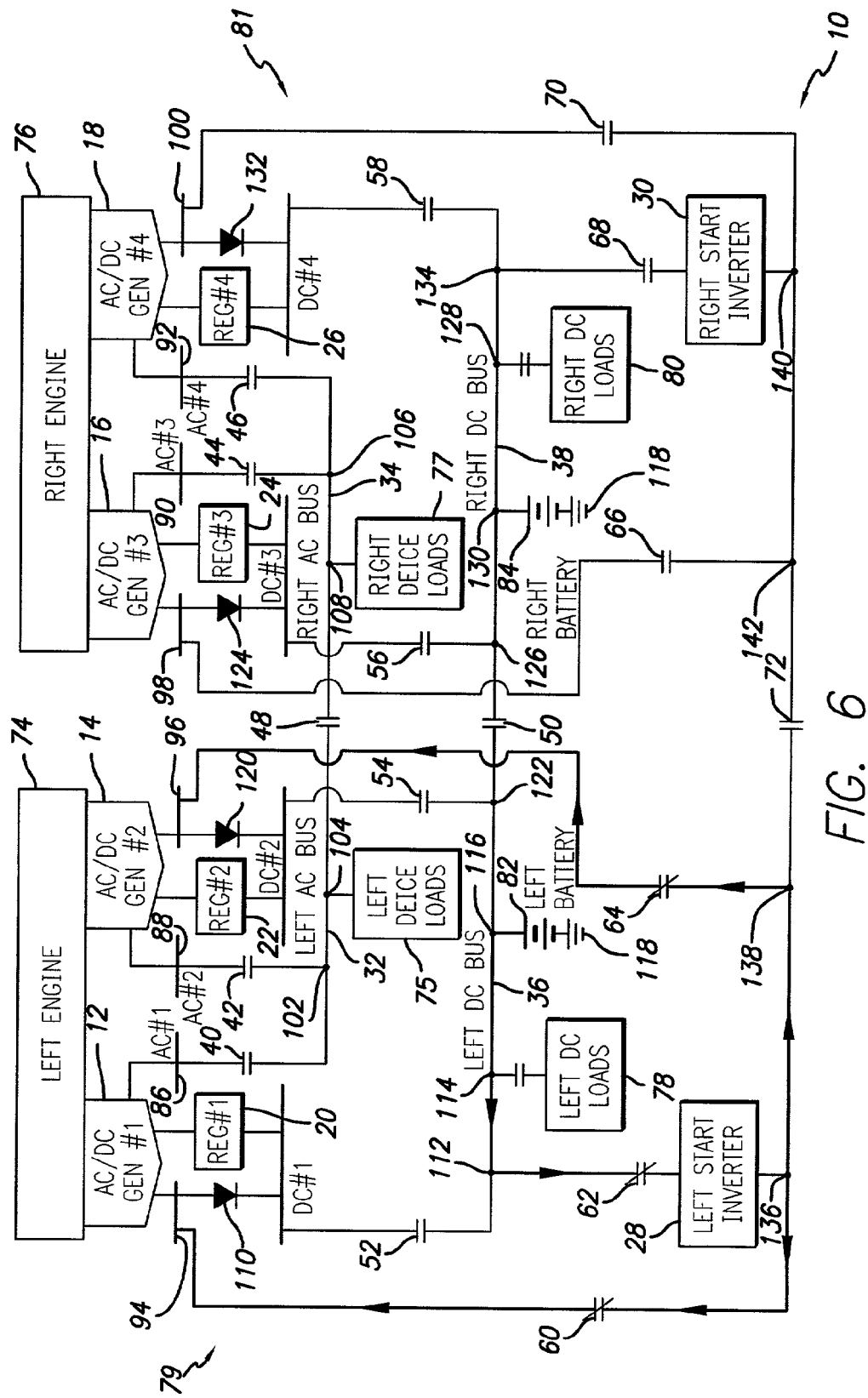
FIG. 6 is a diagrammatic view similar to FIG. 1 showing the electric power and start system in a normal left engine start mode with the DC current path indicated by a heavy line and arrows.

FIG. 6 shows a normal left engine start mode with no component failures in the system 10 or aircraft engines 74, 76. During normal start mode, the left battery 82 provides the power for left engine 74 start and the right battery 84 provides the power for right engine 76 start. In normal left engine 74 start mode, contactors 60, 62, and 64 are closed and contractors 50, 52,54 are open so that direct current flows from left battery 82 through left DC bus 36 to left start inverter 28. Left start inverter 28 selectively inverts this current to provide an appropriate windings driver waveform which is provided through contactor 60 and input/output coupling 94 to AC/DC starter/generator 12 and through contactor 64 and input/output coupling 96 to AC/DC starter/ generator 14. During normal left engine 74 start mode, both AC/DC starter/generators 12 and 14 act as starter motors to drive the shaft of left engine 74 during engine start. Those skilled in the art will recognize that normal right engine 76 normal mode start is accomplished in an identical manner by closing contactors 66, 68, and 70 with contactors 50, 56 and 58 open.

Figure 7:
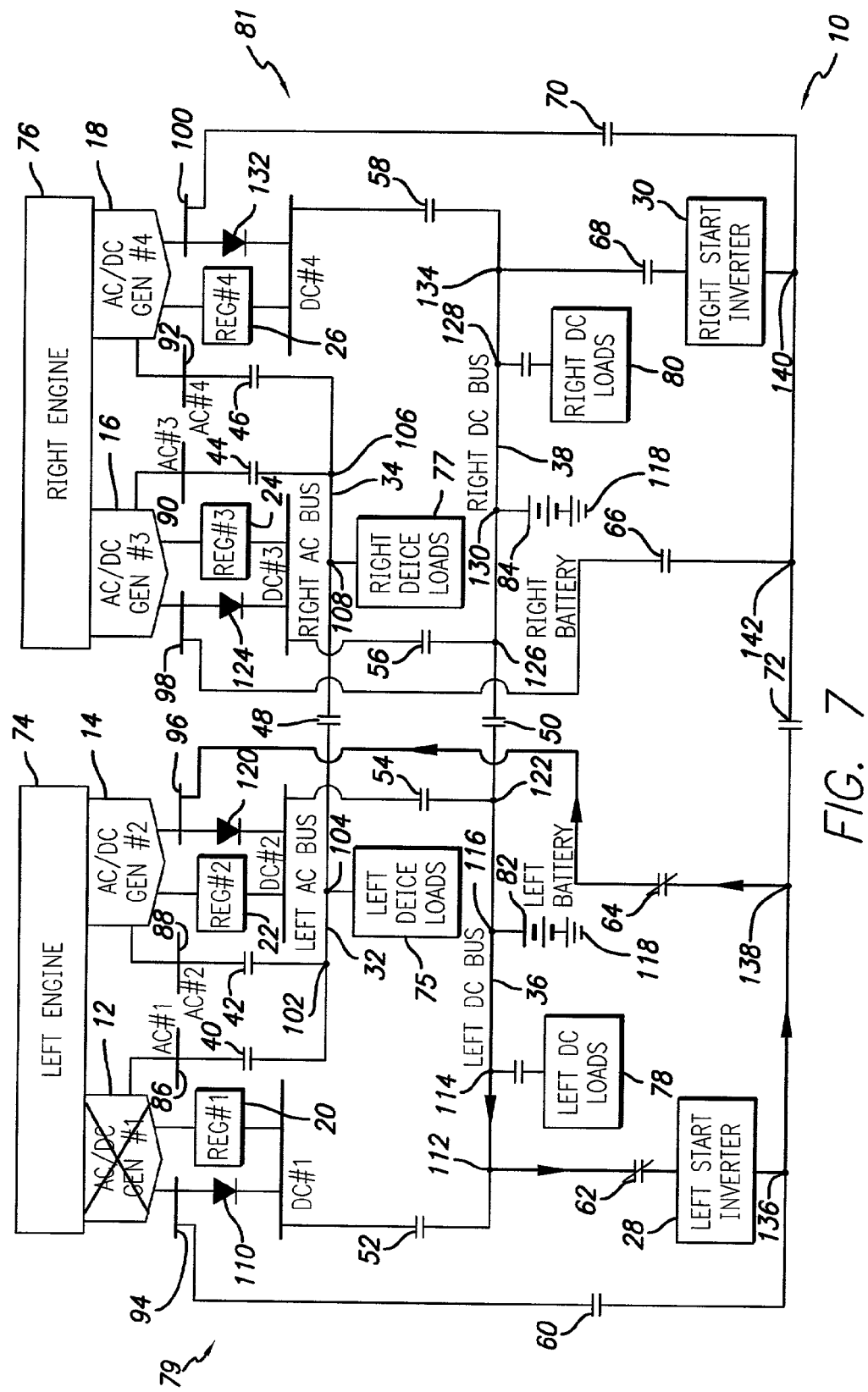
FIG. 7 is a diagrammatic view similar to FIG. 1 showing the electric power and start system in left engine start mode when one channel, shown as AC/DC Gen #1 has failed, with the DC current path indicated by a heavy line and arrows.

FIG. 7 shows a left engine start mode when one channel has failed. The channel failure, while illustrated as a failure of AC/DC starter/generator 12 (crossed out) may also be the result of a failure of contactor 60 or the circuitry between node 136 and AC/DC starter/generator 12. When one channel fails, the remaining active AC/DC starter/generator for the engine 74 with the failed channel acts alone as the starter motor for the engine 74. As shown in FIG. 7, if AC/DC starter/generator 12 is inoperable, then left engine 74 start is accomplished by AC/DC starter/generator 14 alone which drives the shaft of left engine 74 during engine start. Contactors 62 and 64 are closed so that direct current flows from left battery 82 through left DC bus 36 to left start inverter 28. Left start inverter 28 selectively inverts this current to provide an appropriate windings driver waveform which is provided through contactor 64 and input/output coupling 96 to AC/DC starter/generator 14.

Those skilled in the art will recognize that in the event of a channel failure rendering AC/DC starter/generator 14 inoperable, contactors 60 and 62 are closed and AC/DC starter/generator 12 acts as the sole starter motor for left engine 74 in the manner described above in the event of failure of AC/DC starter/generator 12 above. Those skilled in the art will also recognize that in the event of a single channel failure as described above, right engine 76 start mode is accomplished by closing contactors 66 and 68 or contactors 68 and 70 as appropriate to the failure condition in the manner described above in the event of a left engine single channel failure.

Figure 8:
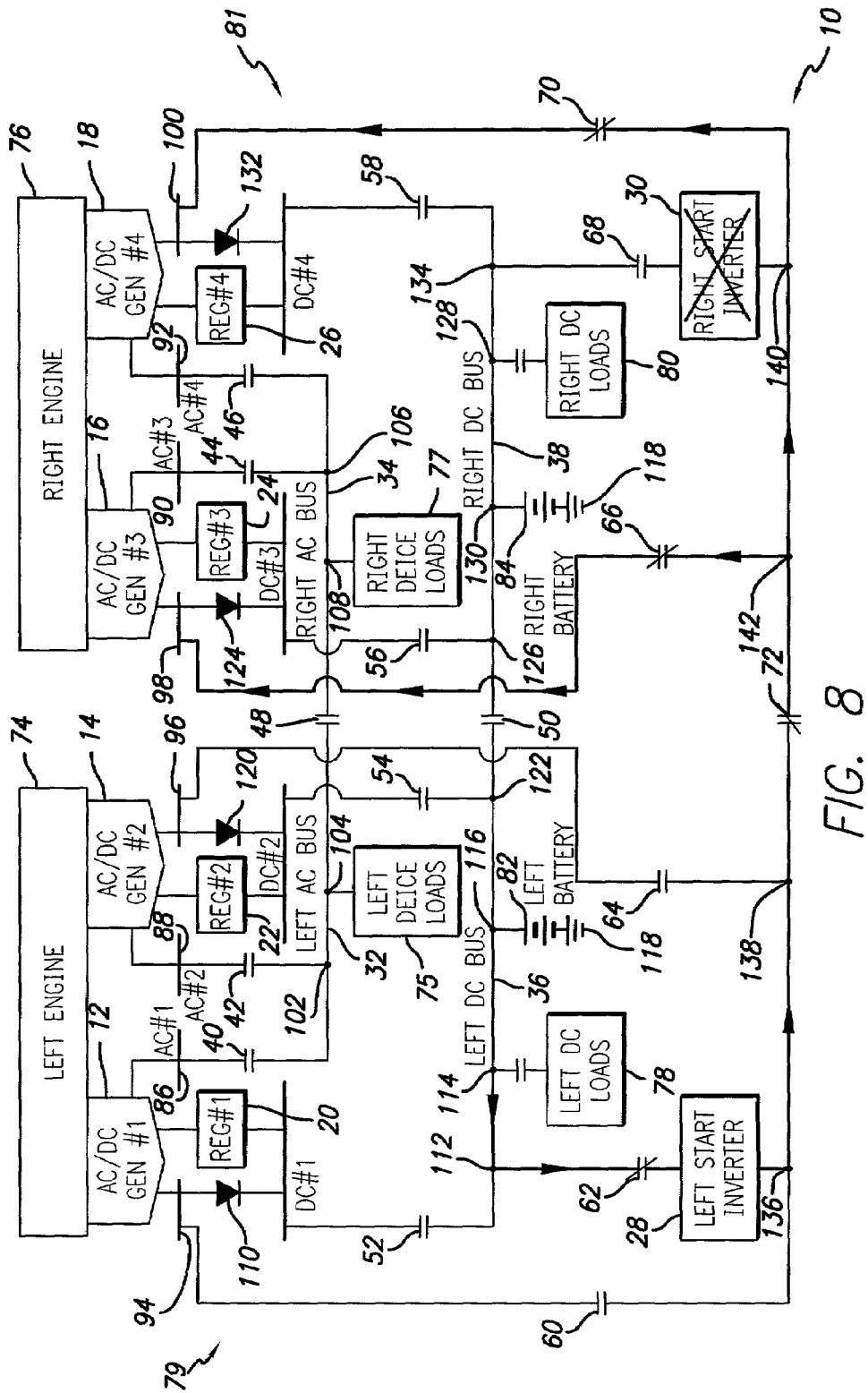
FIG. 8 is a diagrammatic view similar to FIG. 1 showing the electric power and start system in a right engine start mode when the right start inverter has failed with the DC current path indicated by a heavy line and arrows.

FIG. 8 shows the configuration of the system 10 during right engine start mode when the right start inverter 30 has failed (crossed out). When the start inverter on either side of the plane fails, the battery and start inverter from the other side of the plane is used to start the opposite engine. As shown in FIG. 8, when right start inverter 30 fails, contactors 62, 72, 66 and 70 are closed so that current can flow from left battery 82 through left start inverter 28 to both AC/DC starter/generators 16 and 18. Those skilled in the art will recognize that in the event of failure of left start inverter 28, left engine 74 start is accomplished by closing contactors 68, 72, 60 and 64 so that right battery 84 and right start inverter 30 can provide the appropriate windings driver waveform to both AC/DC starter/generators 12 and 14.

Figure 9:
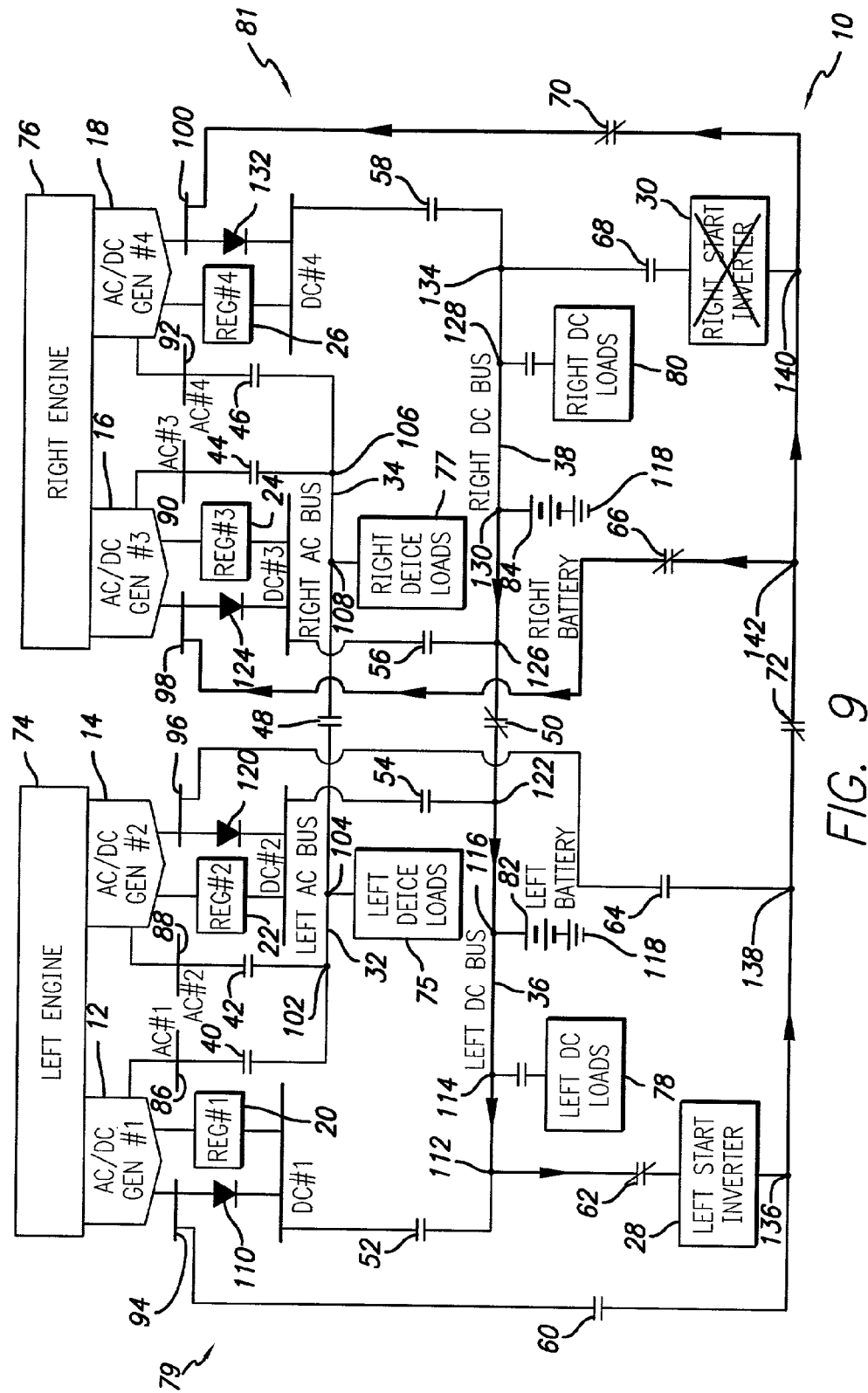
FIG. 9 is a diagrammatic view similar to FIG. 1 showing the electric power and start system in a right engine cold condition start mode when the right start inverter has failed with the DC current path indicated by a heavy line and arrows.

FIG. 9 shows the configuration of the system 10 for right engine 76 cold condition start when the right inverter 30 has failed (crossed out). When cold, batteries produce a lower amperage current than when warm. This reduced amperage output may not be sufficient to efficiently start an engine. To compensate for the reduced amperage output of cold batteries, the system 10 uses the starting power of both batteries 82 and 84 during cold condition engine starts. As shown in FIG. 9, when right start inverter 30 fails during cold conditions, contactors 50, 62, 72, 66 and 70 are closed so that current can flow from both right and left batteries 84 and 82 through left start inverter 28 to both AC/DC starter/generators 16 and 18. Those skilled in the art will recognize that starting power can be boosted in any cold condition start scenario by closing contactor 50 and configuring the system 10 for the normal temperature start mode dictated by the system failure conditions. Those skilled in the art will also recognize that in the event of failure of left start inverter 28 during cold conditions, left engine start is accomplished by closing contactors 50, 68, 72, 60 and 64 so that left battery 82, right battery 84 and right start inverter 30 can provide the appropriate windings driver waveform to both AC/DC starter/generators 12 and 14.

Figure 10:
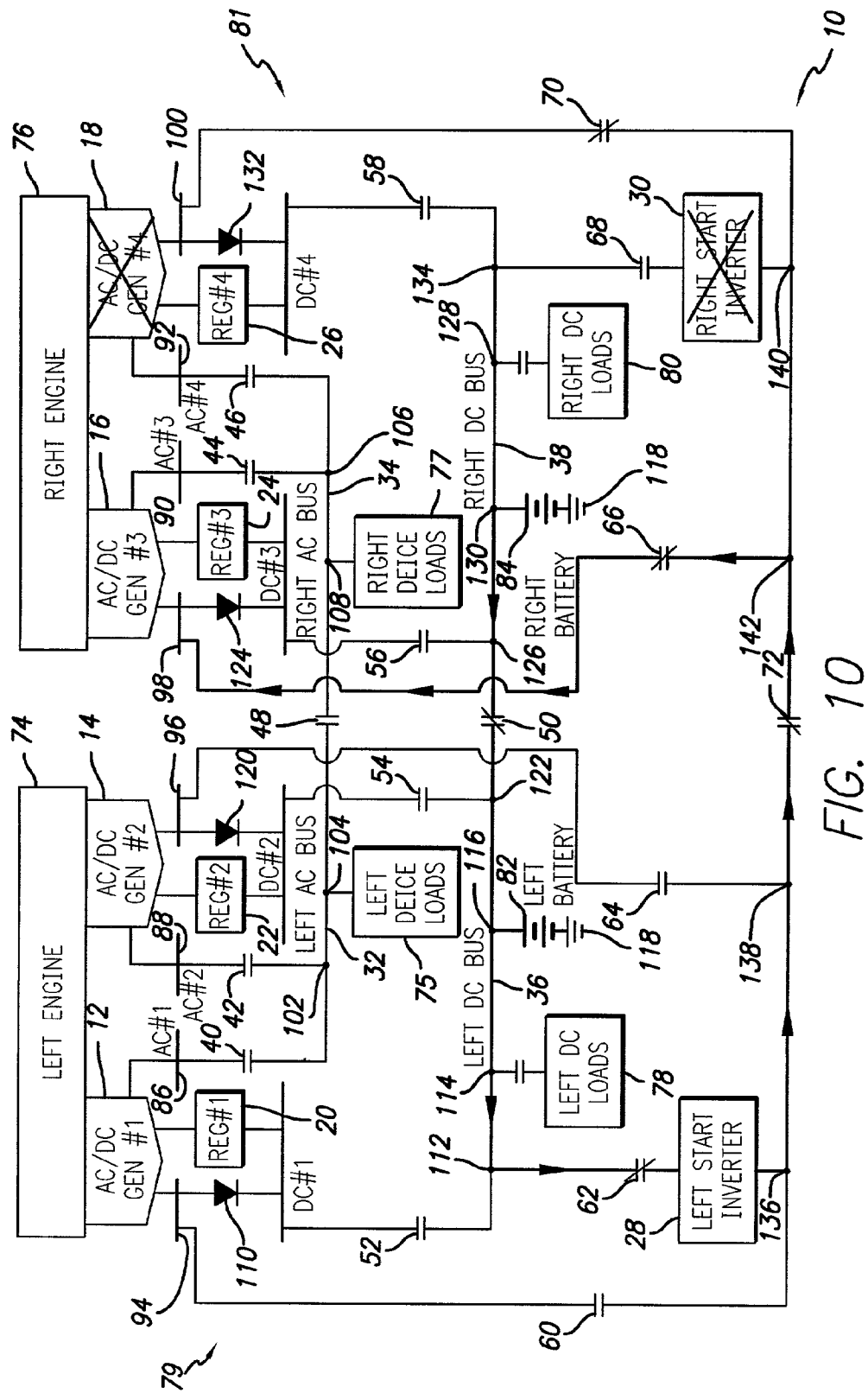
FIG. 10 is a diagrammatic view similar to FIG. 1 showing the electric power and start system in a right engine cold condition start mode when the right start inverter and one channel has failed with the DC current path indicated by a heavy line and arrows.

FIG. 10 depicts the configuration of the system 10 for cold condition starting of right engine when the right start inverter and one channel on the right side has failed rendering AC/DC starter/generator 18 inoperable. When the inverter and one channel used under normal start conditions to start an engine has failed, the remaining operative AC/DC starter/generator for that engine acts alone as a starter motor driven by both batteries in cold conditions. Under these circumstances the start inverter for the opposite engine is used to start the engine.

As shown, for example, in FIG. 10, in cold conditions when right start inverter 30 and the channel including AC/DC starter/generator 18 has failed, contactors 50, 62, 72, and 66 are closed so that both batteries 82 and 84 and left start inverter 28 provide the winding driver signal to AC/DC starter/generator 16 which acts alone as a starter motor to start right engine 76. Similarly, in cold conditions when right start inverter 30 and the channel including AC/DC starter/generator 16 has failed, contactors 50, 62, 72, and 70 are closed so that both batteries 82 and 84 and left start inverter 28 provide the winding driver signal to AC/DC starter/generator 18 which acts alone as a starter motor to start right engine 76. Those skilled in the art will recognize that cold condition start of left engine 74 when left inverter and one of the left channels has failed rendering either AC/DC starter/generator 12 or 14 inoperative is accomplished by closing contacts 50, 68 and 72 as well as either contactor 60 or 64 depending on which AC/DC starter/generator 12 or 14 is operative.

Figure 11:
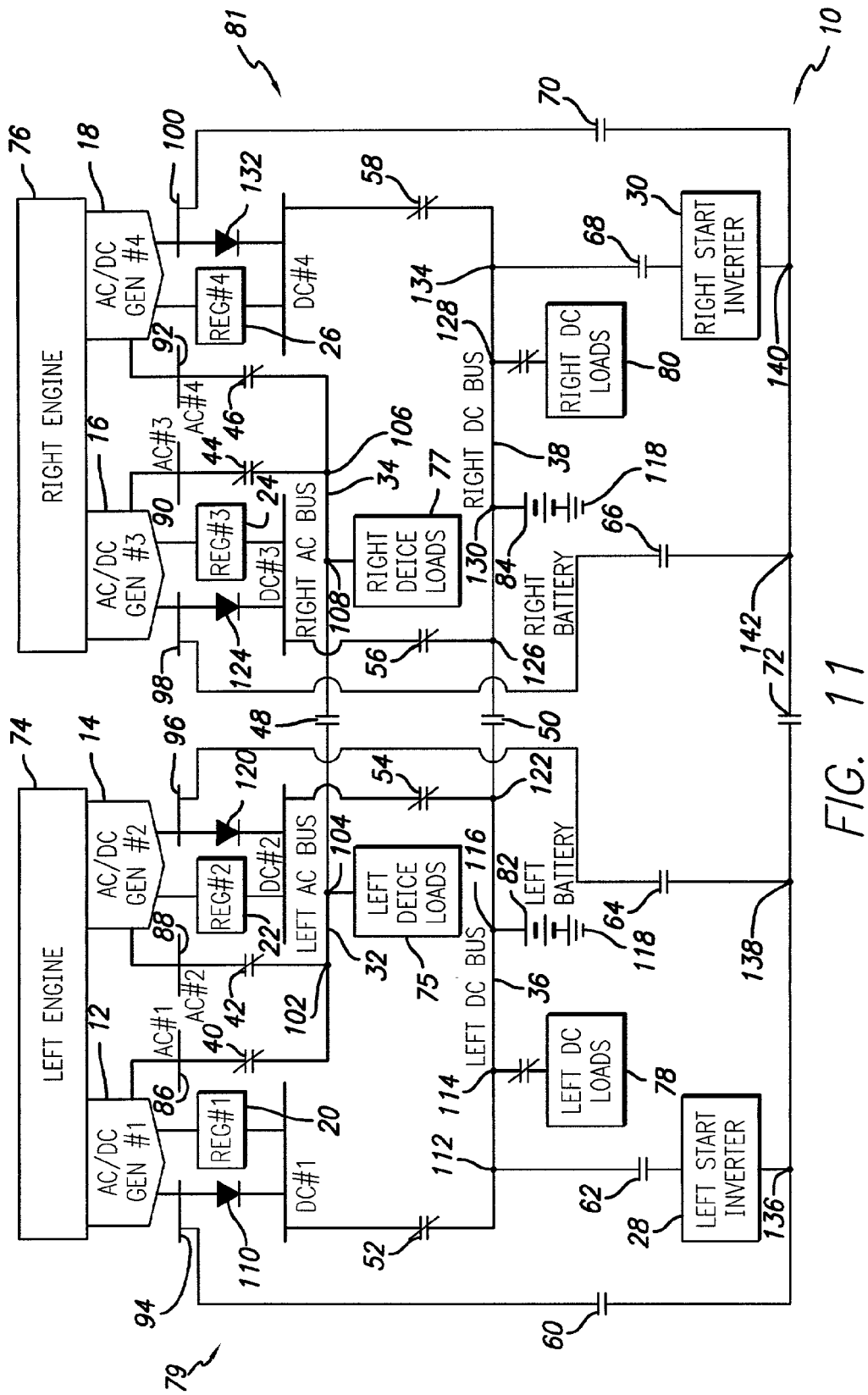
FIG. 11 is a diagrammatic view similar to FIG. 1 showing the electric power and start system in a normal generate mode with the DC current paths indicated by a heavy lines extending from each AC/DC starter/generator through its respective generator control unit to provide current to the DC onboard systems and recharge the batteries and the AC current paths indicated by heavy lines extending from each AC/DC starter/generator to the deicing equipment.

FIG. 11 depicts the normal generate mode for the system 10. As previously stated, when both engines 74, 76 are running, AC/DC starter/generators 12, 14, 16, and 18 provide AC power to run the deicing equipment 75, 77 and DC power to run the onboard systems 78, 80 and charge the batteries 82, 84. As shown in FIG. 11, in normal generate mode, contactors 52 and 54 are closed so that both AC/DC starter/generators 12 and 14 provide regulated DC power through their corresponding generator control units 20 and 22, respectively, to power the left onboard systems 78 and recharge the left battery 82. Contactors 56 and 58 are closed so that both AC/DC starter/generators 16 and 18 provide regulated DC power through their corresponding generator control units 24 and 26, respectively, to power the right onboard systems 80 and recharge the right battery 84. Contactors 40 and 42 are closed so that both AC/DC starter/generators 12 and 14 provide AC power through their corresponding AC outputs 86, 88, respectively, to power the left deicing equipment 75. Contactors 44 and 46 are closed so that both AC/DC starter/generators 16 and 18 provide AC power through their corresponding AC outputs 90, 92, respectively, to power the right deicing equipment 77.

While FIG. 11 shows AC/DC starter/generators 12 and 14 driving left deicing systems 75 simultaneously in parallel and AC/DC starter/generators 16 and 18 driving right deicing systems 77 simultaneously in parallel, in preferred embodiments deicing equipment 75 and 77 includes multiple components each being driven by a single AC/DC starter generator 12, 14, 16, or 18 to avoid waveform synchronization problems. However, those skilled in the art will understand that the waveforms output by the AC/DC starter/generators 12 and 14 or 16 and 18 coupled to the same engine 74 or 76, respectively, can be synchronized using known techniques so that the deicing equipment 75 or 77 can be driven as illustrated in FIG. 11.

Figure 12:
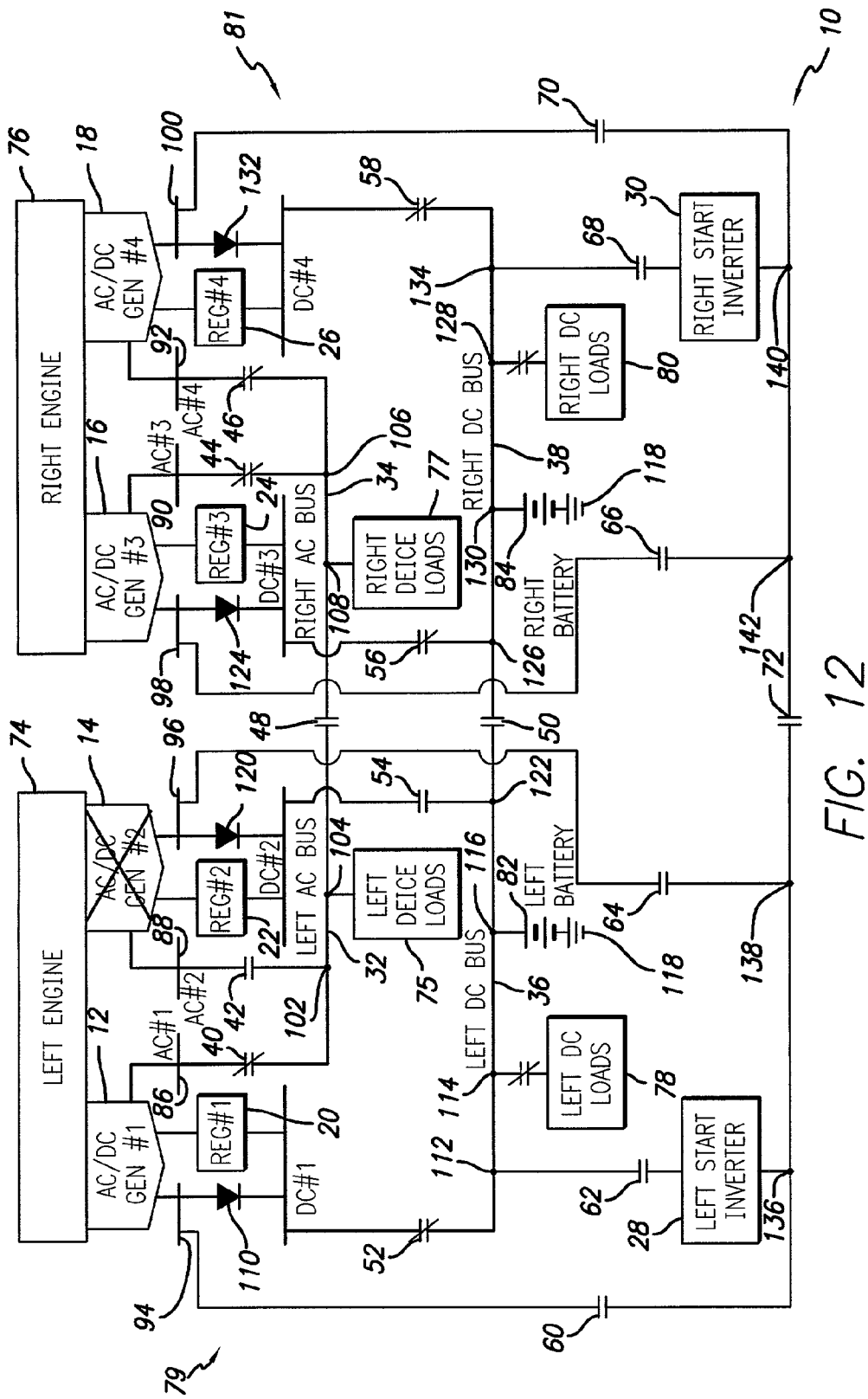
FIG. 12 is a diagrammatic view similar to FIG. 11 showing the electric power and start system in a generate mode when one of the AC/DC starter/generators of the left engine has failed indicating that the remaining AC/DC starter/generator coupled to the left engine supplies all of the power required for operation of the left deicing equipment and the left onboard DC systems as well as for charging the left battery while the right deicing equipment, DC onboard systems and battery are powered in the same manner as under normal generate mode shown in FIG. 11.

FIG. 12 depicts the system 10 configured for generate mode when a single AC/DC starter/generator 14 (crossed out) has failed. When only one of the four AC/DC starter/generators has failed, the other AC/DC starter/generator 14 associated with the same engine 74 as the failed AC/DC starter/generator provides all of the AC and DC power requirements for the systems on that side of the aircraft. In FIG. 11, AC/DC starter/generator 14 has failed. The system 10 is configured so that contactor 52 is closed so that only AC/DC starter/generator 12 provides regulated DC power through generator control unit 20 to power the left onboard systems 78 and recharge the left battery 82. Similarly, contactor 40 is closed so that only AC/DC starter/generator 12 provides AC power through AC output 86 to power the left deicing equipment 75. As in normal generate mode, contactors 56 and 58 are closed so that both AC/DC starter/generators 16 and 18 provide regulated DC power through their corresponding generator control units 24 and 26, respectively, to power the right onboard systems 80 and recharge the right battery 84. Contactors 44 and 46 are closed so that both AC/DC starter/generators 16 and 18 provide AC power through their corresponding AC outputs 90, 92, respectively, to power the right deicing equipment 77.

Those skilled in the art will recognize that if only AC/DC starter/generator 12 failed, the right side of the system 10 would still be configured as shown in FIG. 12. With AC/DC starter/generator 12 failure, the left side 79 of the system 10 would be configured with contactors 42 and 54 being closed so that AC/DC starter/generator 14 would supply all of the AC and DC power to the left side systems 75 and 78 and the left battery 82.

If only AC/DC starter/generator 16 or 18 fails in generate mode, the left side of the system is configured as shown in FIG. 11. If AC/DC starter/generator 16 fails, the right side of the system 10 would be configured so that contactors 46 and 58 are closed so that AC/DC starter/generator 18 provides all of the AC and DC power to the right side systems 77 and 80 and battery 84. If AC/DC starter/generator 18 fails, contactors 44 and 56 are closed so that AC/DC starter/generator 16 provides all of the AC and DC power to the right side systems 77 and 80 and battery 84.

Figure 13:
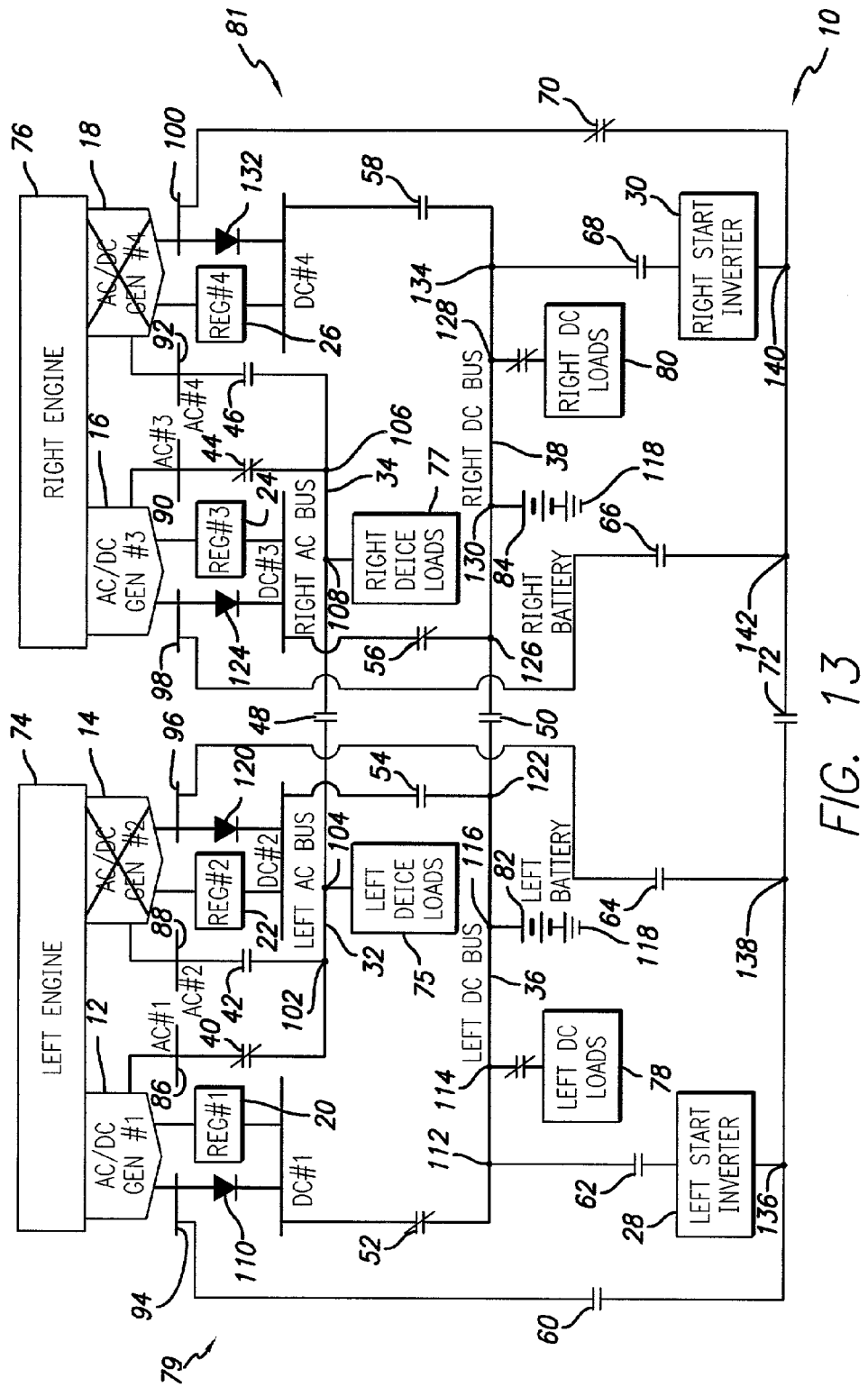
FIG. 13 is a diagrammatic view similar to FIG. 11 showing the electric power and start system in a generate mode when one of the AC/DC starter/generators of the left engine and one of the AC/DC starter/generators of the right engine has failed indicating that the remaining AC/DC starter/generator coupled to the right engine supplies all of the power required for operation of the right deicing equipment and the right onboard DC systems as well as for charging the right battery while the left side devices are powered in the same manner as in FIG. 12.

FIG. 13 depicts the system 10 configured for generate mode when AC/DC starter/generators 14 and 18 have failed, i.e one AC/DC starter/generator failure per engine. When one AC/DC starter/generator mechanically coupled to each engine 74, 76 fails, the operative AC/DC starter/generator for each engine provides all of the AC and DC power required to operated the systems and recharge the battery on its side of the aircraft. As shown, for example, in FIG. 13, contactors 52 and 40 are closed so that AC/DC starter/generator 12 provides the AC and DC power to the left systems 75, 78 and battery 82. Contactors 56 and 44 are closed so that AC/DC starter/generator 16 provides the AC and DC power to the right systems 77, 80 and battery 84. If AC/DC starter/generator 12 had failed, contactors 54 and 42 would be closed so that AC/DC starter/generator 14 would provide the AC and DC power to the left systems 75, 78 and battery 82. Similarly, if AC/DC starter/generator 16 had failed contactors 58 and 46 would be closed so that AC/DC starter/generator 18 provides the AC and DC power to the right systems 77, 80 and battery 84.

Figure 14:
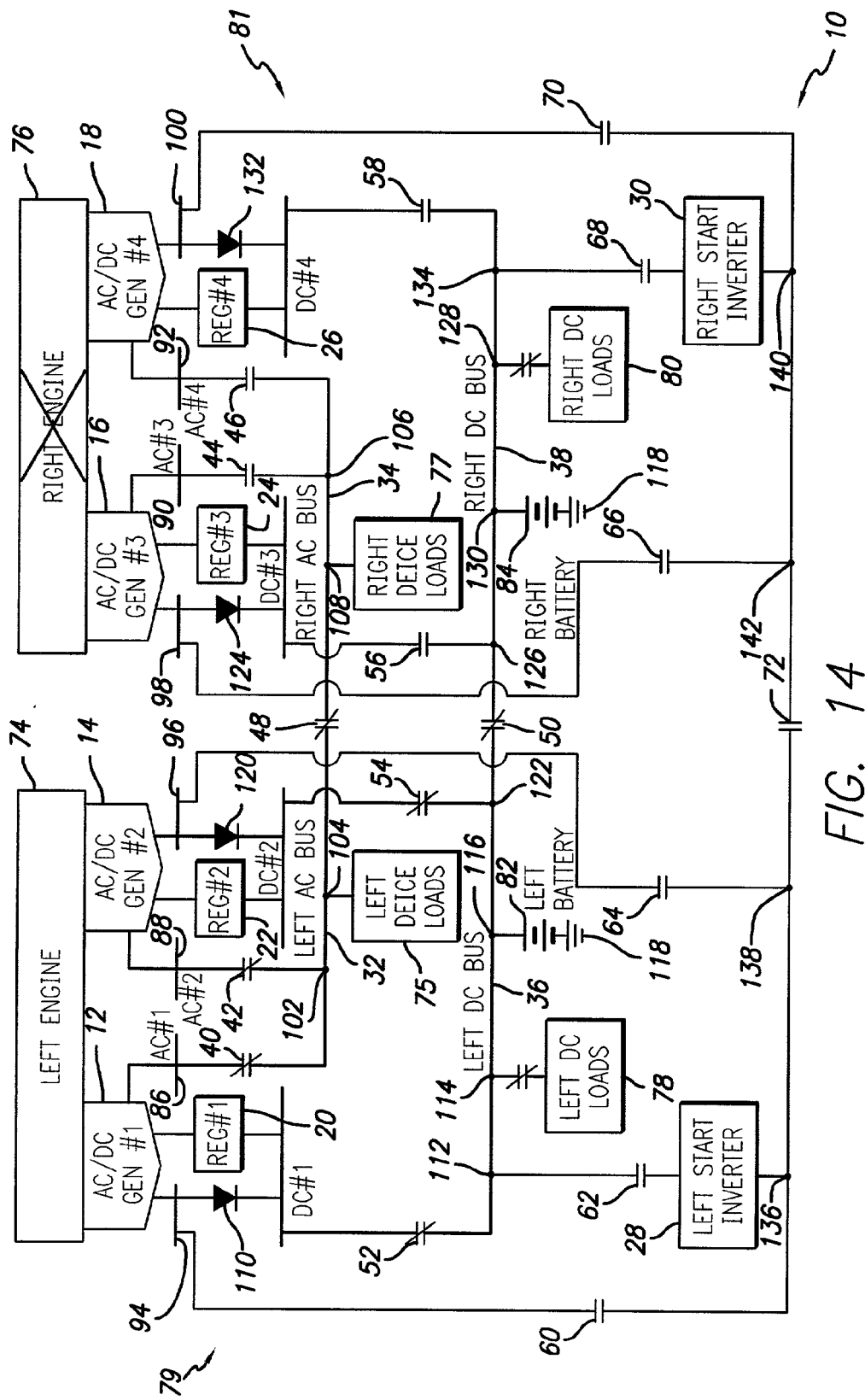
FIG. 14 is a diagrammatic view similar to FIG. 11 showing the electric power and start system in a generate mode when the right engine has failed rendering the two right AC/DC starter/generators non-functional so that the two left AC/DC starter/generators supply alternating current on the AC bus to both the right and left deicing equipment and direct current on the DC bus to the left and right DC on-board systems and batteries.

FIG. 14 shows the system 10 configured in generate mode with right engine 76 failure rendering AC/DC starter/generators 16 and 18 inoperable. When an entire engine 76 fails (crossed out), the AC/DC starter/generators 12, 14 on the other engine 74 provide all the AC and DC power for all systems 75, 77, 78, 80 and batteries 82, 84. As shown for example, in FIG. 14, when right engine 76 has failed, contactors 40, 42 and 48 are closed so that AC/DC starter/generators 12 and 14 provide AC power to the left and right deicing equipment 75, 77. Also, contactors 50, 52 and 54 are closed so AC/DC starter/generators 12 and 14 provide DC power to the left and right onboard systems 78, 80 and batteries 82, 84. Those skilled in the art will recognize that in the event of left engine 74 failure only, contactors 44, 46, 48, 50, 56 and 58 would be closed so that AC/DC starter/generators 16 and 18 would provide AC and DC power to the left and right deicing equipment 75, 77, onboard systems 78, 80 and batteries 82, 84.

Figure 15:
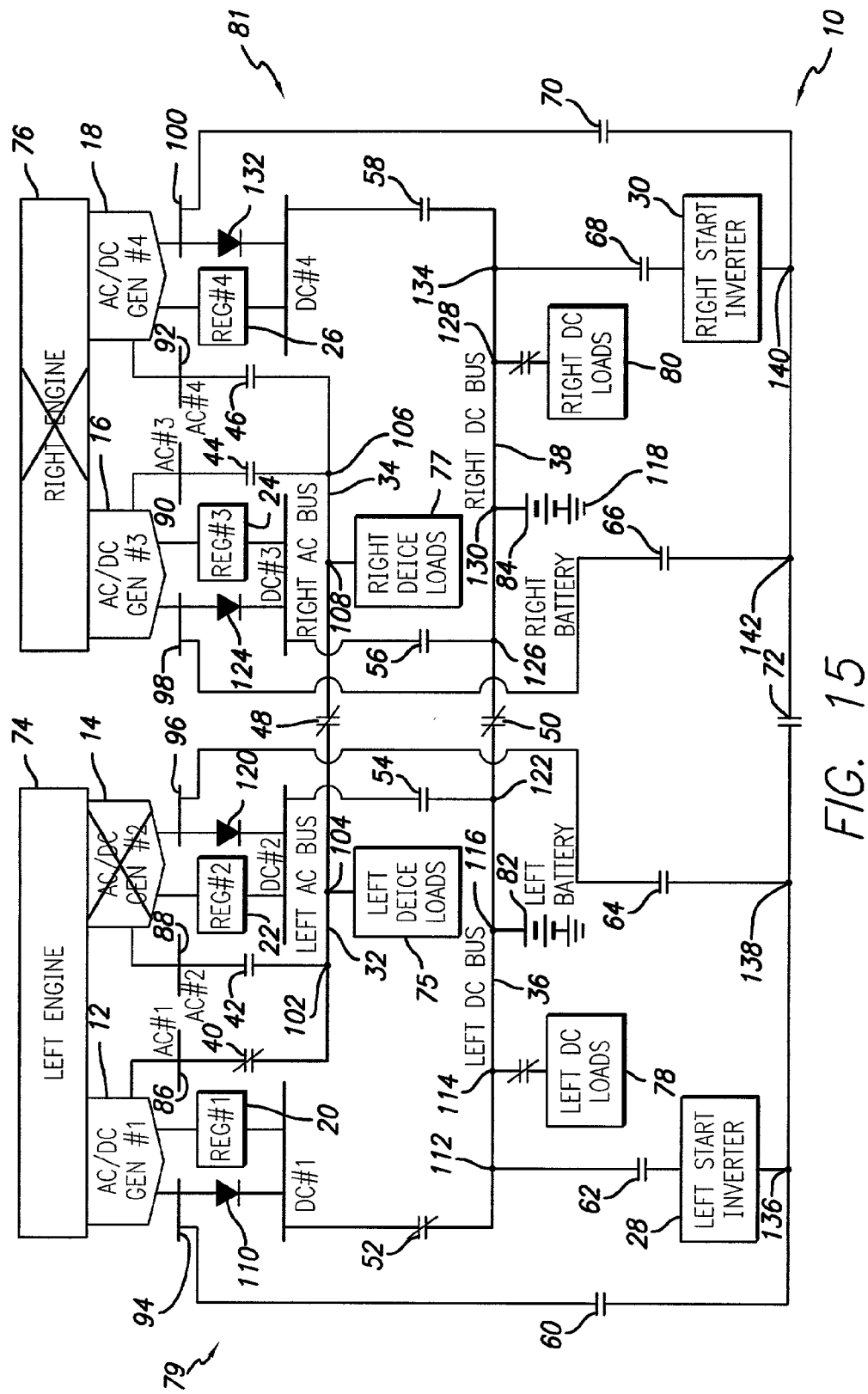
FIG. 15 is a diagrammatic view similar to FIG. 14 showing the electric power and start system in a generate mode when the right engine has failed rendering the two right AC/DC starter/generators non-functional and one of the two left AC/DC starter/generators has failed so that the remaining functional left AC/DC starter/generator supplies alternating current on the AC bus to both the right and left deicing equipment and direct current on the DC bus to the left and right DC on-board systems and batteries.

FIG. 15 depicts the configuration of the system 10 in generate mode when AC/DC starter/generator 14 and right engine 76 has failed (crossed out) so that AC/DC starter/generator 12 alone provides AC and DC power to the left and right deicing equipment 75, 77, onboard systems 78, 80 and batteries 82, 84. As shown in FIG. 15, contactors 40 and 48 are closed so that AC power to the left and right deicing equipment 75, 77 is provided by AC/DC starter/generator 12. Contactors 50 and 52 are closed to provide DC power to the left and right onboard systems 78, 80 and batteries 82, 84 is provided by AC/DC starter/generator 12.

Those skilled in the art will recognize that if only AC/DC starter/generator 14 is operational, contactors 42, 48, 50, and 54 are closed to provides AC and DC power to the left and right deicing equipment 75, 77, onboard systems 78, 80 and batteries 82, 84. Similarly, if only AC/DC starter/generator 16 is operational, contactors 44, 48, 50, and 56 are closed to provides AC and DC power to the left and right deicing equipment 75, 77, onboard systems 78, 80 and batteries 82, 84. Finally, if only AC/DC starter/generator 18 is operational, contactors 46, 48, 50, and 58 are closed to provides AC and DC power to the left and right deicing equipment 75, 77, onboard systems 78, 80 and batteries 82, 84.

FIGS. 6–15 and the descriptions above are not intended as a completely exhaustive description of all of the configurations of the system 10 or all of the fault tolerant system failures which the system 10 can address. The description of FIGS. 6–15 does however indicate that the system 10 is a robust system providing triple redundancy in generate and start modes. From the above descriptions, those skilled in the art will recognize the proper system configuration of the system 10 to address any fault tolerant failure.

The illustrated embodiment of the system 10 is for a two engine aircraft such as a business class passenger jet. Previously, such aircraft typically include a DC starter/generator, a DC generator control unit, a deice generator and an AC generator control unit for each engine. Each DC starter/generator typically includes commutators and brushes and weighs forty-eight pounds. Each DC generator control unit typically weighs three pounds. Each deice generator typically weighs eighteen pounds and each AC generator control unit typically weighs two pounds. Thus on a typical business class two engine passenger jet the typical electric power and start system weighs 130 pounds, provides only single redundancy in generate mode, produces brush dust requiring additional maintenance, has approximately 1000 hours time between scheduled overhauls and is subject to single point failure in start mode.

The described system 10 for a twin engine business class jet includes two brushless AC/DC starter/generators 12, 14, 16, 18 weighing thirty-two pounds each, two generator control units 20, 22, 24, 26 weighing two pounds each, and one start inverter weighing 20 pounds each per engine. Thus the total weight of the system 10 is 176 pounds or only 46 pounds more that the standard system, currently available system, which it replaces. In return for this slight increase in weight, the system 10 provides triple redundancy (although subject to two point failure) in start mode, triple redundancy in generate mode, and has no scheduled overhauls. The high levels of redundancy provide by the system 10 resolves over-water flight issues common in twin engine business class jets equipped with standard previous versions of the system 10. The commonality of the LRU's reduces inventory items which maintenance depots must keep on hand. the system 10 provides enhanced reliability over previous systems, reduces life cycle costs and reduces the supplier base.

While the system 10 has been described as being installed in a twin engine business class jet, it is within the teaching of the present disclosure to provide similarly configured systems 10 in single engine and other multi-engine jets and propeller-driven aircraft. While not illustrated, it is also within the teaching of the invention to provide an AC/DC starter/generator and generator control unit mechanically coupled to an auxiliary power unit of an aircraft and coupled to the onboard systems 78, 80, deicing equipment 75, 77, and batteries 82, 84 of an aircraft.

The system may also include a plurality of AC/DC starter/generators mechanically coupled to each engine of a multi-engine jet and electrically coupled to the systems requiring AC and DC power in flight, an associated generator control unit for each AC/DC starter/generator and a start inverter for each engine. The system may also include switches allowing reconfiguration of the electrical connections of the system to provide redundancy in the start and generator modes. These switches may be preprogrammed to assume established configurations in response to component failures of the EPASS and aircraft. The AC/DC starter/generators may be brushless electric machines. The AC/DC starter/generators may include Amortisseur circuits.

The invention claimed is:

1. A power and start system for use with an engine, the engine including a shaft, systems requiring AC power, and systems requiring DC power, the power and start system operating in at least a generate mode and a start mode, the power and start system comprising:
   an AC/DC starter/generator mechanically coupled to rotate in response to rotation of the engine shaft in generate mode to produce AC and DC power and to rotate the shaft of the engine when in start mode;
   a generator control unit electrically coupled to the AC/DC starter/generator and the systems requiring DC power;
   a start inverter configured to be coupled to a DC power source, the start inverter being coupled to the AC/DC starter/generator to provide power for start mode operation;
   a first controllable contactor coupled to the start inverter;
   a second controllable contactor coupled to the systems requiring AC power; and
   a third controllable contactor coupled to the systems requiring DC power.

2. A power and start system for use with an engine, the engine having a shaft, systems requiring AC power, and systems requiring DC power, the power and start system selectively operating in at least a generate mode and a start mode, the power and start system comprising:
   a first AC/DC starter/generator couplable to the shaft of the engine;
   a second AC/DC starter/generator couplable to the shaft of the engine;
   at least one of the AC/DC starter/generators being rotatable in response to rotation of the engine shaft in generate mode to produce AC and DC power;
   at least one of the AC/DC starter/generators rotating the shaft of the engine in start mode;
   a first generator control unit electrically coupled to the first starter/generator and the systems requiring DC power;
   a second generator control unit electrically coupled to the second starter/generator and the systems requiring DC power;
   a DC power source;
   a start inverter being selectively couplable to the DC power source; and
   a controller coupled to the system for selectively controlling the coupling and uncoupling of at least the first and second starter/generators, the start inverter, and the DC power source.

3. The system of claim 2, further comprising:
   a first controllable contactor coupled to the start inverter and the DC power source;
   a second controllable contactor coupled to the systems requiring AC power and to at least one of the AC/DC starter/generators; and
   a third controllable contactor coupled to the systems requiring DC power and at least one of the AC/DC starter/generators.

4. The system of claim 3, further comprising:
   the second controllable contactor coupled to the systems requiring AC power and selectively couplable to the first AC/DC starter/generator;
   the third controllable contactor coupled to the systems requiring DC power and the first AC/DC starter/generator;
   a fourth controllable contactor coupled to the systems requiring AC power and to the second AC/DC starter/generator; and
   a fifth controllable contactor coupled to the systems requiring DC power and the second AC/DC starter/generator.

5. The system of claim 4, further comprising:
   a sixth controllable contactor coupled to the start inverter and the first AC/DC starter/generator; and
   a seventh controllable contactor coupled to the start inverter and the second AC/DC starter/generator.

6. A power and start system for use with at least a first engine and a second engine; the first engine having a first shaft, a first system requiring AC power, and a first system requiring DC power; the second engine having a second shaft, a second system requiring AC power, and a second system requiring DC power; the power and start system selectively operating in at least a generate mode and a start mode, the power and start system comprising:
   a first AC/DC starter/generator couplable to the first shaft;
   a second AC/DC starter/generator couplable to the first shaft;
   a third AC/DC starter/generator couplable to the second shaft;
   a fourth AC/DC starter/generator couplable to the second shaft;
   at least one of the AC/DC starter/generators being rotatable in response to rotation of the engine shaft in generate mode to produce AC and DC power;
   at least one of the AC/DC starter/generators rotating the shaft of the engine in start mode;
   a first generator control unit electrically coupled to the first starter/generator and the first systems requiring DC power;
   a second generator control unit electrically coupled to the second starter/generator and the first systems requiring DC power;
   a third generator control unit electrically coupled to the third starter/generator and the second systems requiring DC power;

a fourth generator control unit electrically coupled to the fourth starter/generator and the second systems requiring DC power;
a first DC power source selectively couplable to the first and second AC/DC starter/generator and the first systems requiring DC power;
a second DC power source selectively couplable to the third and fourth AC/DC starter/generator and the second systems requiring DC power;
a first start inverter being selectively couplable to the first DC power source;
a second start inverter being selectively couplable to the second DC power source; and
a controller coupled to the system for selectively controlling the coupling and uncoupling of at least the first, second, third and fourth starter/generators, the first and second start inverters, and the first and second DC power sources.

7. The system of claim 6, further comprising:
a DC power source contactor selectively couplable to the first and second DC power sources.

8. The system of claim 6, further comprising:
an AC system contactor selectively couplable to the first and second systems requiring AC power.

9. The system of claim 6, further comprising:
an inverter contactor selectively couplable to the first inverter and the second inverter.

10. The system of claim 6, further comprising:
a DC power source contactor selectively couplable to the first and second DC power sources;
an AC system contactor selectively couplable to the first and second systems requiring AC power; and
an inverter contactor selectively couplable to the first inverter and the second inverter.

11. The system of claim 6, further comprising:
a first controllable contactor coupled to the first start inverter and the first DC power source;
a second controllable contactor coupled to the first systems requiring AC power and to at least one of the first and second AC/DC starter/generators; and
a third controllable contactor coupled to the first systems requiring DC power and at least one of the first and second AC/DC starter/generators.

12. The system of claim 11, further comprising:
the second controllable contactor coupled to the first systems requiring AC loads and selectively couplable to the first AC/DC starter/generator;
the third controllable contactor coupled to the first systems requiring DC loads and the first AC/DC starter/generator;
a fourth controllable contactor coupled to the first systems requiring AC power and to the second AC/DC starter/generator; and
a fifth controllable contactor coupled to the first systems requiring DC power and the second AC/DC starter/generator.

13. The system of claim 12, further comprising:
a sixth controllable contactor coupled to the first start inverter and the first AC/DC starter/generator; and
a seventh controllable contactor coupled to the first start inverter and the second AC/DC starter/generator.

14. The system of claim 6, further comprising:
an eighth controllable contactor coupled to the second start inverter and the second DC power source;
a ninth controllable contactor coupled to the second systems requiring AC loads and to at least one of the third and fourth AC/DC starter/generators; and
a tenth controllable contactor coupled to the second systems requiring DC loads and at least one of the third and fourth AC/DC starter/generators.

15. The system of claim 14, further comprising:
the ninth controllable contactor coupled to the second systems requiring AC loads and selectively couplable to the third AC/DC starter/generator;
the tenth controllable contactor coupled to the second systems requiring DC loads and the third AC/DC starter/generator;
a eleventh controllable contactor coupled to the second systems requiring AC loads and to the fourth AC/DC starter/generator; and
a twelfth controllable contactor coupled to the second systems requiring DC loads and the fourth AC/DC starter/generator.

16. The system of claim 15, further comprising:
a thirteenth controllable contactor coupled to the second start inverter and the third AC/DC starter/generator; and
a fourteenth controllable contactor coupled to the second start inverter and the fourth AC/DC starter/generator.

17. The system of claim 6, farther comprising:
a first controllable contactor coupled to the first start inverter and the first DC power source;
the second controllable contactor coupled to the first systems requiring AC loads and selectively couplable to the first AC/DC starter/generator;
the third controllable contactor coupled to the first systems requiring DC loads and the first AC/DC starter/generator;
a fourth controllable contactor coupled to the first systems requiring AC loads and to the second AC/DC starter/generator;
a fifth controllable contactor coupled to the first systems requiring DC loads and the second AC/DC starter/generator;
a sixth controllable contactor coupled to the first start inverter and the first AC/DC starter/generator;
a seventh controllable contactor coupled to the first start inverter and the second AC/DC starter/generator;
an eighth controllable contactor coupled to the second start inverter and the second DC power source;
the ninth controllable contactor coupled to the second systems requiring AC loads and selectively couplable to the third AC/DC starter/generator;
the tenth controllable contactor coupled to the second systems requiring DC loads and the third AC/DC starter/generator;
a eleventh controllable contactor coupled to the second systems requiring AC loads and to the fourth AC/DC starter/generator;
a twelfth controllable contactor coupled to the second systems requiring DC loads and the fourth AC/DC starter/generator;
a thirteenth controllable contactor coupled to the second start inverter and the third AC/DC starter/generator; and
a fourteenth controllable contactor coupled to the second start inverter and the fourth AC/DC starter/generator.

18. The system of claim 6, further comprising:
a DC power source contactor selectively couplable to the first and second DC power sources.

19. The system of claim 17, further comprising:
an AC system contactor selectively couplable to the first and second systems requiring AC power.

20. The system of claim 17, further comprising:
an inverter contactor selectively couplable to the fist inverter and the second inverter.

21. The system of claim 17, further comprising:
a DC power source contactor selectively couplable to the first and second DC power sources;
an AC system contactor selectively couplable to the first and second systems requiring AC power; and
an inverter contactor selectively couplable to the first inverter and the second inverter.

* * * * *